UNITED STATES PATENT OFFICE.

ANDREW A. DUNHAM, OF BAINBRIDGE, NEW YORK, ASSIGNOR TO THE CASEIN MANUFACTURING COMPANY, A CORPORATION OF VERMONT.

ART OF PRODUCING GLUES OR CEMENTS.

1,391,768.  Specification of Letters Patent.  Patented Sept. 27, 1921.

No Drawing.  Application filed March 16, 1918. Serial No. 222,961.

*To all whom it may concern:*

Be it known that I, ANDREW A. DUNHAM, a citizen of the United States, residing at Bainbridge, in the county of Chenango and State of New York, have invented or discovered certain new and useful Improvements in the Art of Producing Glues or Cements, of which the following is a specification.

The object of this invention or discovery is the production of a glue or cement of water-resisting properties and of such a character as to enable articles or surfaces that have been glued or cemented therewith to be subjected to the action of boiling water without endangering separation of the joints.

In order to produce glues or cements of the above description, I prefer to use as a binder, casein or other proteids soluble in water, in combination with a caustic alkali, such as caustic soda or caustic potash, and an alkaline earth hydroxid, such as calcium hydroxid, although the alkaline earth hydroxid may be omitted from the marketable preparation, if desired, to be added to the proteid mixture or solution by the user.

My preferred method of preparing the waterproof glue or cement is as follows: to 100 parts, by weight, of a dry proteid, preferably dry commercial casein, I add about 300 parts, by weight, of water at a temperaure of approximately 100° F. and agitate the mass until the casein becomes soft, although this agitation is not positively essential, then about five parts, by weight, of sodium hydroxid in about ten parts, by weight, of water are added to the casein mixture, the agitation being continued until the casein has been dissolved. This forms a thick viscous mass. In another receptacle I take about 100 parts, by weight, of hydrated lime (calcium hydroxid) with about 100 parts, by weight, of water, stir thoroughly to obtain a homogeneous mixture, and then stir this mixture of calcium hydroxid and water into the viscous casein mass above referred to. As soon as the calcium hydroxid is added to the casein mass a thinning action takes place, rendering the mixture of a suitable viscosity to be applied mechanically with a proper apparatus, or by hand with an ordinary gluing brush.

It is to be understood that I do not limit my invention or discovery to the above-named proportions of the ingredients mentioned, as the amount of alkali used in dissolving the casein may be varied according to the quality of casein used; likewise, the proportion of hydrated lime may be varied according to the results desired. For a cement with quicker setting properties I prefer to decrease the proportion of hydrated lime, and for one having slower setting qualities, to increase the percentage of hydrated lime employed. Further, I do not wish to limit myself to the use of the caustic alkalies hereinbefore specified for dissolving the casein, as any alkali having the property of dissolving the casein and rendering same waterproof, or insoluble in water, in cobination with lime, is suitable for the purpose. Neither do I wish to limit myself to the use of calcium hydroxid in the proposed glue or cement as I have found that the hydrates of other alkaline earths have the property of combining with casein and caustic alkalies to produce a waterproof glue or cement.

I am aware of the fact that lime has heretofore been used in combination with casein to produce so-called waterproof glues and similar products, but to my knowledge no glue or cement has been produced, with these constituents, which has been able to withstand the action of boiling water.

Having thus described my invention or discovery I claim and desire to secure by Letters Patent:

1. The herein described process of preparing a glue or cement capable of resisting the action of boiling water, consisting in mixing about 100 parts of dry commercial casein with from 200 to 300 parts of water, agitating the mixture until the casein becomes soft, then adding about five parts of dry caustic alkali to the casein mixture, agitating this mixture until the casein has been dissolved, and then stirring into this casein mixture a substantial amount, of not less than 50 per cent. of the amount of the casein, of an alkaline earth hydroxid.

2. A composition, to be mixed with lime in the preparation of a glue or cement capable of resisting the action of boiling water, comprising a mixture of about 100 parts, by weight, of casein, with about five parts, by weight, of a caustic alkali, and about 310 parts, by weight, of water.

3. A composition, to be used in the preparation of a glue or cement capable of resisting the action of boiling water, comprising a mixture of about 100 parts, by weight, of dry commercial casein, with about five parts, by weight, of a caustic alkali, from 50 to 100 parts of an alkaline earth hydroxid, and sufficient water to dissolve the mixture into a solution of suitable viscosity.

4. A composition, to be used in the preparation of a glue or cement capable of resisting the action of boiling water, comprising a mixture of about 100 parts, by weight, of casein, with about five parts, by weight, of a caustic alkali, about 310 parts, by weight, of water, and about 100 parts, by weight, of an alkiline earth hydroxid previously mixed with water.

5. A composition, to be used in the preparation of a glue or cement capable of resisting the action of boiling water, comprising a mixture of about 100 parts, by weight, of casein, with about five parts, by weight, of a caustic alkali, about 310 parts, by weight, of water, and about 100 parts, by weight, of calcium hydroxid previously mixed with water.

In testimony whereof I affix my signature.

ANDREW A. DUNHAM.